Figure 1:
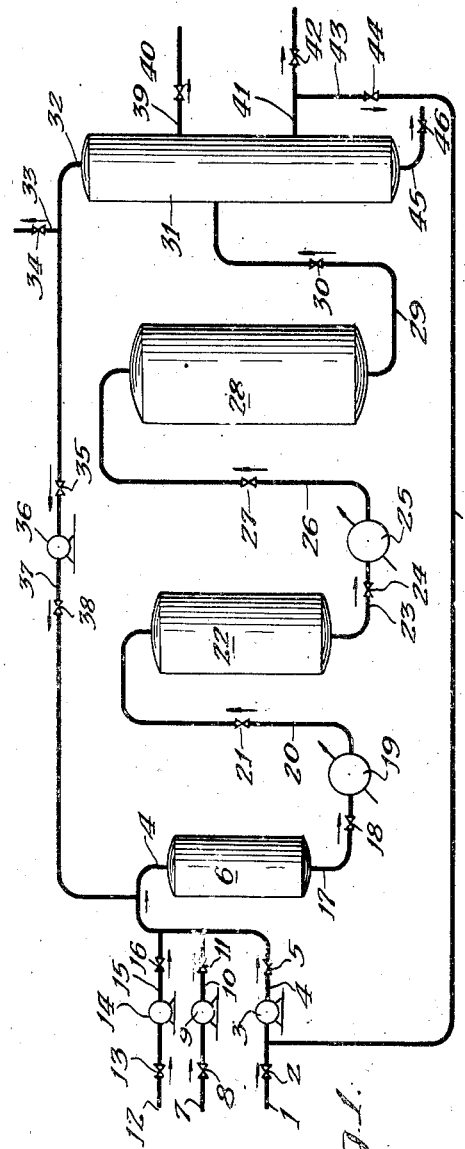

May 23, 1944.  H. PINES ET AL  2,349,516
TREATMENT OF PARAFFINS
Filed May 31, 1941

Inventors:
Herman Pines
Herman S. Bloch
By: Lee J. Gary
Attorney

Patented May 23, 1944

2,349,516

UNITED STATES PATENT OFFICE 2,349,516

TREATMENT OF PARAFFINS

Herman Pines and Herman S. Bloch, Chicago, Ill., assignors to Universal Oil Products Company, Chicago, Ill., a corporation of Delaware Application May 1, 1941, Serial No. 396,172

11 Claims. (Cl. 260—683.5)

This application is a continuation-in-part of our co-pending application Serial No. 332,501, filed April 30, 1940.

This invention relates to the treatment of paraffin hydrocarbons of normal or mildly-branched chain structure, and more specifically it is concerned with a process for converting paraffins of normal and mildly-branched chain structure into isoparaffins and paraffins of more branched chain structure, the process involving the use of special catalysts and particular conditions of operation which favor isomerization reactions so that relatively high yields are produced of desired branched chain paraffin hydrocarbons.

The formation of isoparaffins or more-branched chain paraffin hydrocarbons from the corresponding less-branched chain liquid paraffins is desirable because of the generally higher antiknock value of the iso-compounds. Furthermore, the branched chain paraffins both gaseous and liquid, which are generally more reactive than the corresponding normal hydrocarbons, may be utilized in the production of other branched-chain paraffins by so-called alkylation reactions in the presence of suitable catalysts. Also iso-butane may be dehydrogenated to the corresponding branched chain olefin which is utilizable for the production of high quality gasoline by a combination of catalytic polymerization followed by hydrogenation of the polymers to form a paraffinic motor fuel of relatively high antiknock value suitable for use in airplane and automobile engines.

In one specific embodiment the present invention comprises a process for isomerizing normal or mildly branched paraffin hydrocarbons into more highly branched chain paraffin hydrocarbons which comprises subjecting a mixture of said normal paraffin hydrocarbons, hydrogen, and a hydrogen halide to contact, in a plurality of catalyst sections, with separate beds of a composite catalyst comprising essentially a major proportion of a substantially inert carrier and a minor proportion of an aluminum chloride containing isomerizing catalyst, said catalyst sections being maintained at successively lower temperatures along the line of flow, and having increasing capacities to permit longer times of contact as the temperatures are decreased.

Normal paraffin hydrocarbons with which the process of the present invention is concerned are both gaseous and liquid. Normal butane, which constitutes a gaseous normal paraffin which may be isomerized by the process of this invention, is produced in considerable quantities in the oil refining industry. Both normal butane and iso-butane occur in substantial amounts in natural gases (in which the normal compound usually predominates), in refinery gases which are evolved from crude petroleum storage tanks, and in gases obtainable in the primary distillation of crudes; and they are also present in considerable percentages in the gases produced incidental to the cracking of heavy petroleum fractions for the production of gasoline. In the case of cracked gas mixtures, the relative proportions of iso and normal butanes vary, but the ratio of the iso to the normal compound is as a rule considerably higher than in natural gas.

Butanes may be considered as more or less marginal compounds in respect to their desirability in ordinary gasoline, that is, a certain percentage of them is essential for sufficient vapor pressure to insure ease in starting, while an excess tends to produce vapor lock. For these reasons the total percentage of 4-carbon atom hydrocarbons is commonly adjusted in conjunction with the boiling range and vapor pressure of the other gasoline components to produce a gasoline of desirable starting characteristics according to seasonal demands.

Liquid normal paraffins are produced in considerable quantities in the oil refining industry. They occur in substantial amounts in natural gasolines, in the higher boiling constituents of natural gas commonly known as "casing head gasoline," and in gasolines produced in relatively high yields by the cracking of relatively heavy petroleum fractions. In the case of cracked gasolines, the relative proportions of iso and normal paraffins vary.

An important feature of the present invention consists in the use of isomerizing catalyst in separate beds of increasing size and maintained at successively lower temperatures in order to produce a reaction mixture containing a relatively high concentration of isomerized products. This method of operating is superior to isomerization in a single stage at an approximately uniform temperature because of the effects of temperature upon the speed of isomerization and the maximum isomerization obtainable when equilibrium has been reached at any given temperature. For example, we have found that with normal butane the speed of isomerization increases with the temperature while the concentration of isobutane in an equilibrium mixture of isobutane and normal butane decreases with increasing reaction temperature as shown in the table, which has been derived from a large amount of experimental work.

TABLE

*Equilibrium compositions of n-butane-isobutane mixtures*

| Temperature, °C. | Isobutane (approx.) |
|---|---|
| | Per cent |
| 50 | 83-90 |
| 100 | 73-80 |
| 150 | 63-70 |
| 200 | 55-62 |
| 250 | 48-52 |

The values listed in the table, however, give no indication of the time required to produce from normal butane the indicated equilibrium yield of isobutane. At the lower temperatures in the indicated range the speed of isomerization is low with little or substantially no accompanying side reactions, while at higher temperatures the isomerization per pass is greater and the desired reaction is accompanied by some decomposition which results in the formation of lower boiling and higher boiling paraffins. For example, several isomerization runs made in the presence of a composite of 33% by weight of aluminum chloride and 67% by weight of charcoal at different temperatures on a mixture of normal butane, hydrogen chloride, and hydrogen present in the respective molecular proportions of 100, 12, and 3 gave the following results when the normal butane was charged at a constant liquid space velocity of 1:

| Temperature, °C. | Per cent conversion per pass of normal butane into— | |
|---|---|---|
| | i-Butane | Propane |
| 160 | 21 | 0 |
| 180 | 41 | 1.1 |
| 200 | 51 | 7.0 |

Other runs were made on an equimolecular mixture of normal butane and isobutane in the presence of 3-4 mole per cent of hydrogen chloride and 1 mole per cent of hydrogen using a catalyst composite consisting of 60% of activated charcoal supporting 40% by weight of a metal halide mixture comprising 1 molecular proportion of aluminum chloride and 0.57 molecular proportion of zirconium chloride. As shown by the following data, the highest concentration of isobutane was obtained at the lowest temperature tried, namely, 150° C.

| Temperature, °C. | Liquid butane space velocity | Composition of reaction products, mole per cent | | | |
|---|---|---|---|---|---|
| | | i-Butane | Propane | n-Butane | $C_5$+ |
| 150 | 1.0 | 61.0 | 0.6 | 37.5 | 0.9 |
| 200 | 1.0 | 50.2 | 6.6 | 36.2 | 7.0 |
| 250 | 1.0 | 45.6 | 8.5 | 37.6 | 8.3 |

These results indicate that the high activity of the catalyst at the higher temperatures resulted in excessive decomposition and a consequent lower yield of the desired isobutane.

Thus we have found it advantageous to contact normal butane with aluminum chloride-carrier composites in the presence of hydrogen and hydrogen chloride at 200° C. to obtain a butane mixture containing approximately 40–50% of isobutane per pass which may be subjected to contact with the same type of isomerizing catalyst in subsequent reactors maintained at lower temperature. Thus, passage of an equimolecular mixture of isobutane and normal butane through such an isomerizing catalyst at 150° C. employing a liquid space velocity of 1 may result in the production of a butane fraction containing as high as 70% isobutane, and if desired, said fraction may be utilized in alkylation reactions, after which the unconverted normal butane may be recycled to further isomerizing treatment.

In accordance with the present invention we have now found that additional benefits may be obtained if, in addition to utilizing lower temperatures along the line of flow in a series of isomerizing reactors, the time of contact be increased to permit time for a further approach to equilibrium conditions. Thus the process is preferably operated so that successive reactors have larger volumes of catalyst. In a process operating in such a manner that catalyst beds are rotated and their position in the line of flow is changed in accordance with their activity it will be necessary when operations are conducted in accordance with the present invention to provide reactors in various types of parallel connection so that for example the first stage is operated with a single reactor, the second stage with two reactors in parallel and the third stage with three reactors in parallel. This type of mechanical operation is considered to be sufficiently well known in processes analogous to the present process so that detailed description of such manipulation is not necessary.

Catalysts suitable for isomerizing paraffin hydrocarbons according to the process of this invention at successively decreasing temperatures in order to produce a mixture relatively rich in more-branched chain paraffins comprise essentially aluminum chloride, either alone or mixed with one or more other metal halides, composited with a porous support such as activated carbon, activated charcoal, pumice, fuller's earth, bentonite, montmorillonite, infusorial earth, diatomaceous earth, kieselguhr, silica-alumina composite, unglazed porcelain, firebrick, etc. Other halides which may be used with aluminum chloride and carriers to produce isomerizing catalysts may comprise boron fluoride, aluminum bromide, and chlorides of beryllium, titanium, zirconium, columbium, tantalum, hafnium, thorium, zinc, iron, copper, etc.

Temperatures suitable for use in effecting the process of this invention are within the approximate range of 25–350° C. and suitable pressures range from approximately 50 to 1500 pounds per square inch. These temperature and pressure ranges include the approximate limits which are feasible. That is, 350° C. is about the highest temperature which can be used in the first of the series of reactors and 25° C. is the lowest temperature which can be practically employed in the last of a series to obtain suitable conversion rates. In regard to times of contact these will obviously be varied not only with the actual temperature and pressure conditions but with the relative activity of different catalyst beds which may vary from fresh to completely exhausted material.

The process may be carried out in the presence of as much as 25 to 30 mole per cent of hydrogen chloride and as much as 50 mole per cent of hydrogen based upon the hydrocarbon charged. In the absence of added hydrogen, isomerization is generally accompanied by the formation of undesirable decomposition products, rapid formation of sludge on the aluminum chloride-containing catalyst, an early decrease in catalytic activity, and a relatively short catalyst life.

The process of this invention is preferably carried out continuously by passing a mixture of a normal paraffin, hydrogen, and hydrogen chloride through a series of reaction zones, of increasing volume charged with an aluminum chloride-containing composite and maintained at progressively decreasing temperatures sufficient for isomerizing at practical rates a substantial proportion of the paraffinic fraction charged.

It is in accordance with the present invention to add hydrogen chloride between successive reactors which addition increases the activity of the succeeding catalyst beds at the lower temperatures which occur progresively along the line of flow. Also pressure may be reduced in successive chambers along the line of flow to insure vapor phase conditions although obviously best results will be obtained when the highest pressure is used consistent with the maintenance of the desired vapor phase since the higher pressure increases both contact time and the partial pressures of hydrogen chloride and hydrogen.

The successive stages of the process of this invention may be carried out in the presence of sections of the same catalyst or of different catalysts. When different catalysts are used in successive stages at decreasing temperatures, it may be advisable to use a catalyst or catalyst composite of relatively low isomerizing activity at the higher temperature in order to speedily effect partial isomerization without suffering a relatively high loss of paraffinic hydrocarbons through decomposition reactions, which during isomerization of normal butane may produce propane, pentane, and other products resulting from side reactions. In the succeeding stage or stages maintained at a lower temperature, catalysts may be employed with greater isomerizing activity and for longer times of contact so that the isoparaffin yield will more rapidly approach the maximum obtainable at equilibrium under the more favorable conditions used. Catalysts of relatively high activity may be produced by compositing a greater proportion of aluminum chloride with a substantially inert carrier as well as by adding other metal halides to the mixture being composited. The advantage of this procedure is evidenced by the fact that normal butane did not isomerize at 25° C. even after being in contact with aluminum chloride for a period of one year, whereas 30% of isobutane was formed from normal butane after standing in contact with aluminum bromide at 25° C. during 48 hours.

The process of this invention may be applied to a number of paraffin hydrocarbon fractions to accomplish isomerization reactions, but the conditions for effecting optimum results are necessarily dependent upon such factors as the composition and activity of the catalyst, and the chemical nature, structure, and boiling range of the fractions undergoing treatment. Furthermore it is not intended to imply that any particular catalysts, conditions of operation or combination of conditions of operation are necessarily equivalent.

Figure 2:
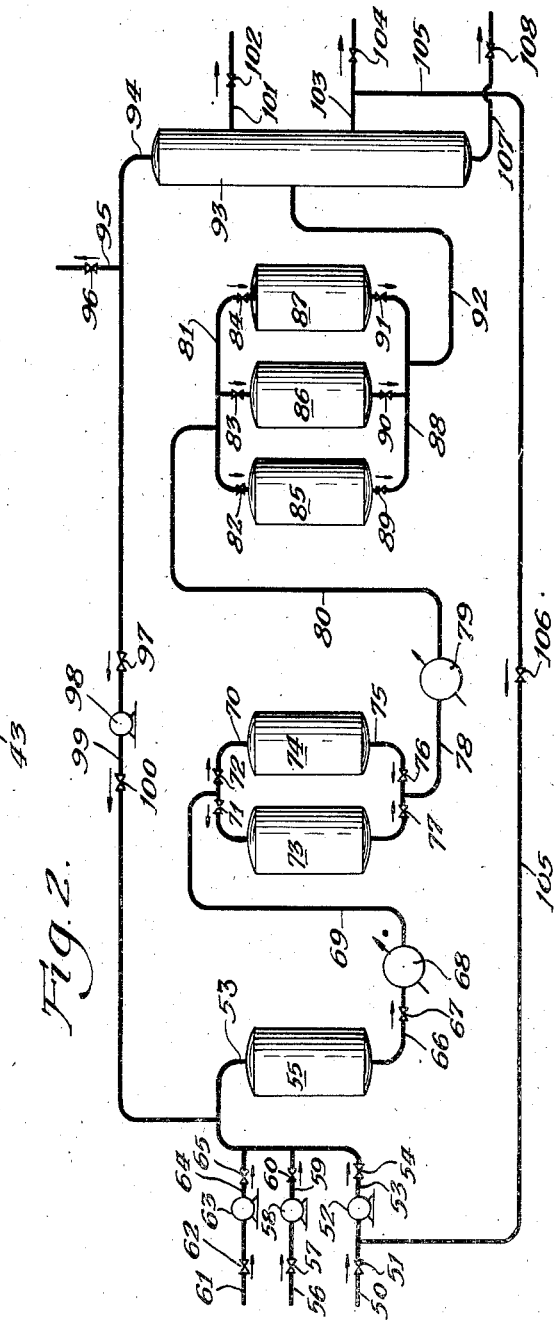

Figure 1 of the drawing illustrates an arrangement of apparatus wherein catalyst chambers of increasing volume are employed. Figure 2 illustrates a different arrangement of apparatus wherein the catalyst chambers are of equal size but each isomerization stage is provided with an increasing number of said chambers arranged for parallel flow.

Referring to Figure 1, a normal paraffin to be isomerized, e. g. normal butane, is introduced through line 1 and valve 2 to pump 3 which discharges through line 4 containing valve 5 into the first isomerization zone 6. The desired amount of hydrogen chloride is added to zone 6 by means of line 7 containing valve 8, pump or compressor 9, and line 10 containing valve 11. Hydrogen may also be added through line 12 containing valve 13, pump or compressor 14, and line 15 containing valve 16.

The effluent reactor mixture from zone 6 is passed through line 17 and valve 18 to cooler 19 and thence through line 20 containing valve 21 to the second isomerization zone 22 which is operated at a lower temperature. This zone contains a catalyst mass of substantially larger volume than the catalyst mass in zone 6 thereby providing for an increased contact time in zone 22. The effluent reaction mixture from zone 22 is removed through line 23 containing valve 24 and is passed through cooler 25 and line 26 containing valve 27 to a third isomerization zone 28 which is operated at a still lower temperature. Zone 28 contains a catalyst mass having a volume substantially greater than the volume of the catalyst mass in zone 22. The reaction mixture is removed from zone 28 and is introduced by means of line 29 containing valve 30 to fractionator 31.

It will, of course, be understood that zone 31 is merely representative of a separation system generally and, if desired, any number of fractionators or other suitable separation steps may be employed. Hydrogen chloride (and hydrogen if used) is removed through line 32 containing valve 35 and is recycled by means of pump or compressor 36 through line 37 containing valve 38 and line 4 into isomerization zone 6. Although not shown in the drawing, the hydrogen chloride and/or hydrogen removed in line 32 is often in admixture with light hydrocarbons, e. g. propane, ethane, etc. In such cases it will be necessary to provide suitable means, e. g. an absorption system, to separate hydrogen chloride and/or hydrogen from the light hydrocarbons. If desired, any portion of the hydrogen chloride (and hydrogen) in line 32 may be withdrawn from the system through line 33 containing valve 34. It is also within the scope of the invention to introduce hydrogen chloride and/or hydrogen at a plurality of points in the reaction system, particularly between the several reaction stages. By the latter method of operation it is possible to adjust the hydrogen chloride and/or hydrogen concentration independently in each isomerization stage. Isobutane is recovered through line 39 and valve 40. Unconverted normal butane is withdrawn through line 41 containing valve 42 and is preferably recycled through line 43 containing valve 44 to line 1 from which it is returned to the first isomerization zone as shown. Higher boiling reaction products may be withdrawn through line 45 and valve 46.

In Figure 2 a modified arrangement of apparatus is shown. In this method of operation the catalyst chambers in the several isomerization stages are of approximately equal volume and increased contact time in the successive isomerization stages is obtained by providing an increasing number of said catalyst chambers arranged in parallel.

Normal butane may be charged through line 50 containing valve 51, pump 52, and line 53 containing valve 54 to the first isomerization zone 55. Hydrogen chloride is added through line 56 containing valve 57, pump or compressor 58, and line 59 containing valve 60. Hydrogen may be supplied through line 61 containing valve 62, pump or compressor 63, and line 64 containing valve 65.

The reaction products from the first stage are passed through line 66 containing valve 67, cooler 68, and line 69 to manifold 70. This stream is then split and directed through valves 71 and 72 to catalyst chambers 73 and 74 wherein further isomerization is effected at a lower temperature and increased contact time. The effluent reaction products are withdrawn through manifold 75 containing valve 76 and 77 and are then supplied through line 78 to cooler 79 and thence through line 80 to manifold 81. The reaction mixture is directed through valves 82, 83, and 84 to catalyst chambers 85, 86, and 87 wherein the isomerization reaction is allowed to proceed to a further extent at a still lower temperature and greater contact time. The final reaction products are removed through valves 89, 90, and 91 to manifold 88 and thence through line 92 to fractionator 93.

In zone 93 hydrogen chloride and/or hydrogen are removed overhead through line 94 containing valve 97 and are recycled by means of pump or compressor 98 and line 99 containing valve 100 to line 53. If desired, a portion of the mixture in line 94 may be vented through line 95 containing valve 96. Isobutane is recovered through line 101 and valve 102. Unconverted normal butane may be withdrawn through line 103 containing valve 104 and is preferably recycled to isomerization zone 55 by means of line 105 containing valve 106. Higher boiling reaction products are removed through line 107 containing valve 108.

Although Figures 1 and 2 depict the use of three isomerization stages, it will be apparent that any desired number of two or more reaction stages may be provided.

The following numerical data are presented to indicate some of the results obtainable in isomerizing paraffin hydrocarbons by the present process, although it is not intended to thereby limit the scope of the invention:

EXAMPLE

Normal butane was passed over a catalyst consisting of 60 parts by weight of activated charcoal and 40 parts by weight of a composite of 1 molecular proportion of aluminum chloride and 0.7 molecular proportion of zirconium chloride. This treatment, in the presence of 6 mole per cent of hydrogen chloride and 1 mole per cent of hydrogen at 200° C. under a pressure of 650 pounds per square inch with 2.0 liquid space velocity of charge, yielded 40% of isobutane per pass.

The mixture of isobutane, normal butane, hydrogen and hydrogen chloride, as well as propane, pentane, etc. formed in the first reactor was next passed through a second and larger reactor containing about double the volume of the said catalyst maintained at 150° C., so that the liquid hourly space velocity was about half that of the first stage. The product recovered after this treatment contained 80% of isobutane, a yield unobtainable at 200° C. by a single treatment without intermediate fractionation.

The character of the process of the present invention and particularly its commercial value are evident from the preceding specification and example presented, although neither section is intended to be unduly limiting in its generally broad scope.

We claim as our invention:

1. A process for isomerizing a paraffin hydrocarbon to produce more highly branched derivatives thereof which comprises subjecting a proportioned mixture of said hydrocarbon, hydrogen and a hydrogen halide to contact with successive sections of a composite catalyst comprising essentially a major proportion of a substantially inert carrier and a minor proportion of a metal halide-containing catalyst, said sections being maintained at successively lower temperatures and having increasing volumes as the temperatures are decreased.

2. A process for isomerizing normal butane to produce substantial yields of isobutane therefrom which comprises subjecting a proportioned mixture of said normal butane, hydrogen, and a hydrogen halide to contact with successive sections of a composite catalyst comprising essentially a major proportion of a substantially inert carrier and a minor proportion of a metal halide-containing catalyst, said sections being maintained at successively lower temperatures and having increasing volumes as the temperatures are decreased.

3. A process for isomerizing a paraffin hydrocarbon to produce more highly branched derivatives thereof which comprises subjecting a proportioned mixture of said hydrocarbon, hydrogen and hydrogen chloride to contact with successive sections of a composite catalyst comprising essentially a major proportion of a substantially inert carrier and a minor proportion of an aluminum chloride-containing catalyst composite, said sections being maintained at successively lower temperatures and having increasing volumes as the temperatures are decreased.

4. A process for isomerizing normal butane to produce substantial yields of isobutane therefrom which comprises subjecting a proportioned mixture of said normal butane, hydrogen and hydrogen chloride to contact with successive sections of a composite catalyst comprising essentially a major proportion of a substantially inert carrier and a minor proportion of an aluminum chloride-containing catalyst composite, said sections being maintained at successively lower temperatures and having increasing volumes as the temperatures are decreased.

5. A process for isomerizing a paraffin hydrocarbon to produce more highly branched derivatives thereof which comprises subjecting a proportioned mixture of said hydrocarbon, hydrogen and hydrogen chloride to contact with successive sections of a composite catalyst comprising essentially a major proportion of a substantially inert carrier and a minor proportion of an aluminum chloride-containing catalyst composite, said sections being maintained at successively lower temperatures with a range having as its upper limit 350° C. and as its lower limit 25° C. and having increasing volumes as the temperatures are decreased.

6. A process for isomerizing normal butane to produce substantial yields of isobutane therefrom which comprises subjecting a proportioned mixture of said normal butane, hydrogen and hydrogen chloride to contact with successive sections of a composite catalyst comprising essentially a major proportion of a substantially inert carrier and a minor proportion of an aluminum chloride-containing catalyst composite, said sections being maintained at successively lower temperatures with a range having as its upper limit 350° C. and as its lower limit 25° C., and having increasing volumes as the temperatures are decreased.

7. A process for isomerizing a paraffin hydrocarbon to produce more highly branched derivatives thereof which comprises subjecting a proportioned mixture of said hydrocarbon, hydrogen and hydrogen chloride under a superatmospheric pressure of from about 50 to about 1500 pounds per square inch to contact with successive sections of a composite catalyst comprising essentially a major proportion of a substantially inert carrier and a minor proportion of an aluminum chloride-containing catalyst composite, said sections being maintained at successively lower temperatures with a range having as its upper limit 350° C. and as it lower limit 25° C., and having increasing volumes as the temperatures are decreased.

8. A process for isomerizing normal butane to produce substantial yields of isobutane therefrom which comprises subjecting a proportioned mixture of said normal butane, hydrogen, and hydrogen chloride under a superatmospheric pressure from about 50 to about 1500 pounds per square inch to contact with successive sections of a composite catalyst comprising essentially a major proportion of a substantially inert carrier and a minor proportion of an aluminum chloride-containing catalyst composite, said sections being maintained at successively lower temperatures with a range having as its upper limit 350° C. and as its lower limit 25° C., and having increasing volumes as the temperatures are decreased.

9. A process for isomerizing paraffins which comprises passing the same in series through a plurality of solid masses comprising an isomerizing catalyst, and maintaining said masses at successively lower isomerizing temperatures in the direction of flow of the paraffins therethrough, said masses being of increasing volume in the direction of decreasing temperatures, whereby to provide a longer contact time in the last than in the first mass of the series.

10. A process for isomerizing paraffin hydrocarbons which comprises passing the paraffins in admixture with a hydrogen halide through a plurality of solid masses comprising a metal halide isomerizing catalyst, and maintaining said masses at successively lower isomerizing temperatures in the direction of flow of the paraffins therethrough, said masses being of increasing volume in the direction of decreasing temperatures, whereby to provide a longer contact time in the last than in the first mass of the series.

11. A process for isomerizing paraffin hydrocarbons which comprises passing the paraffins in admixture with hydrogen chloride through a plurality of solid masses containing aluminum chloride, and maintaining said masses at successively lower isomerizing temperatures in the direction of flow of the paraffins therethrough, said masses being of increasing volume in the direction of decreasing temperatures, whereby to provide a longer contact time in the last than in the first mass of the series.

HERMAN PINES.
HERMAN S. BLOCH.